(12) United States Patent
Motowski et al.

(10) Patent No.: US 7,731,268 B2
(45) Date of Patent: Jun. 8, 2010

(54) ARMREST SUPPORT BRACKET FOR MOTORIZED VEHICLES

(75) Inventors: Peter F. Motowski, Royal Oak, MI (US); Gaurav Sharma, Troy, MI (US); Christopher K. Horn, Plymouth, MI (US); Charles J. Wawa, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/027,360

(22) Filed: Feb. 7, 2008

(65) Prior Publication Data

US 2009/0200831 A1 Aug. 13, 2009

(51) Int. Cl.
*B60J 9/00* (2006.01)
(52) U.S. Cl. .................... 296/153; 280/751; 296/187.05
(58) Field of Classification Search .................. 296/153, 296/1.09, 187.05; 280/748, 751
See application file for complete search history.

(56) References Cited

U.S. PATENT DOCUMENTS

| | | | | |
|---|---|---|---|---|
| 2,661,052 A | * | 12/1953 | Bushong | 297/411.21 |
| 3,015,516 A | * | 1/1962 | Clark | 296/153 |
| 3,387,881 A | * | 6/1968 | Stepanek et al. | 296/153 |
| 4,375,268 A | * | 3/1983 | Speck | 224/556 |
| 4,625,265 A | * | 11/1986 | Bushong | 362/549 |
| 5,181,759 A | * | 1/1993 | Doolittle | 296/153 |
| 5,527,084 A | * | 6/1996 | Scherf | 296/153 |

* cited by examiner

*Primary Examiner*—Dennis H Pedder
(74) *Attorney, Agent, or Firm*—Quinn Law Group, PLLC

(57) ABSTRACT

A support bracket for an armrest assembly having a pull-handle or pull-cup is provided for use in a motorized vehicle. The support bracket includes a generally horizontal support member configured to extend, at least in part, adjacent to or through an internal cavity of the pull-handle/pull-cup. The support bracket also includes at least two, but preferably three leg members spaced apart from one another and operatively attached at respective first ends to the support member. Each leg member extends downward from the support member in an oblique manner to attach at a respective second end to an inner support panel. The leg members are configured to sustain a predetermined minimum vertical loading condition, and controllably deform under a predetermined threshold lateral loading condition. The leg members create a load path for transferring vertical loads imparted to the armrest assembly to the vehicle interior surface as a substantially vertical force.

13 Claims, 2 Drawing Sheets

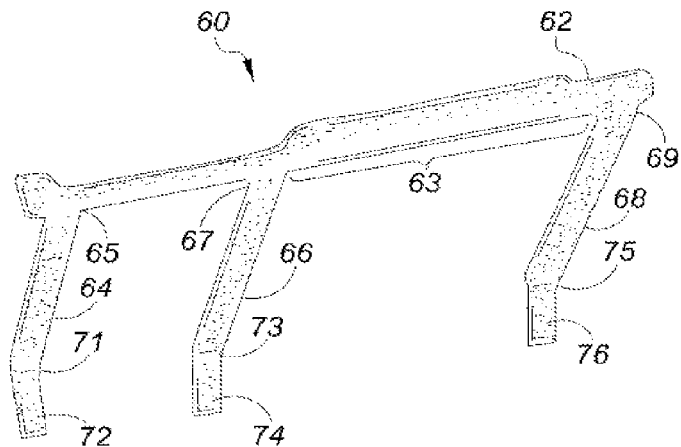
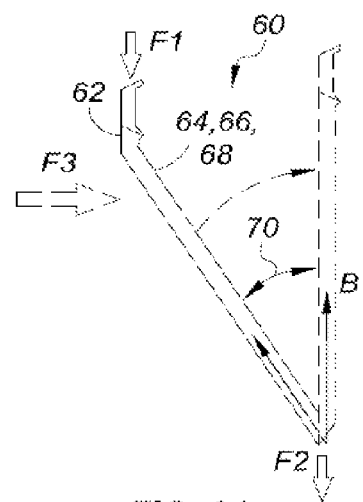
FIG. 3    FIG. 3A
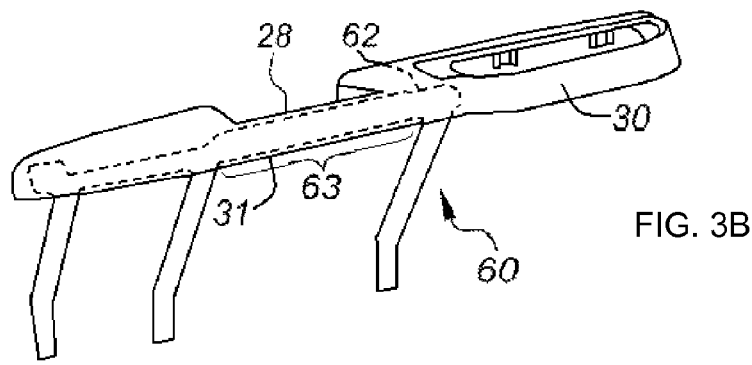
FIG. 3B
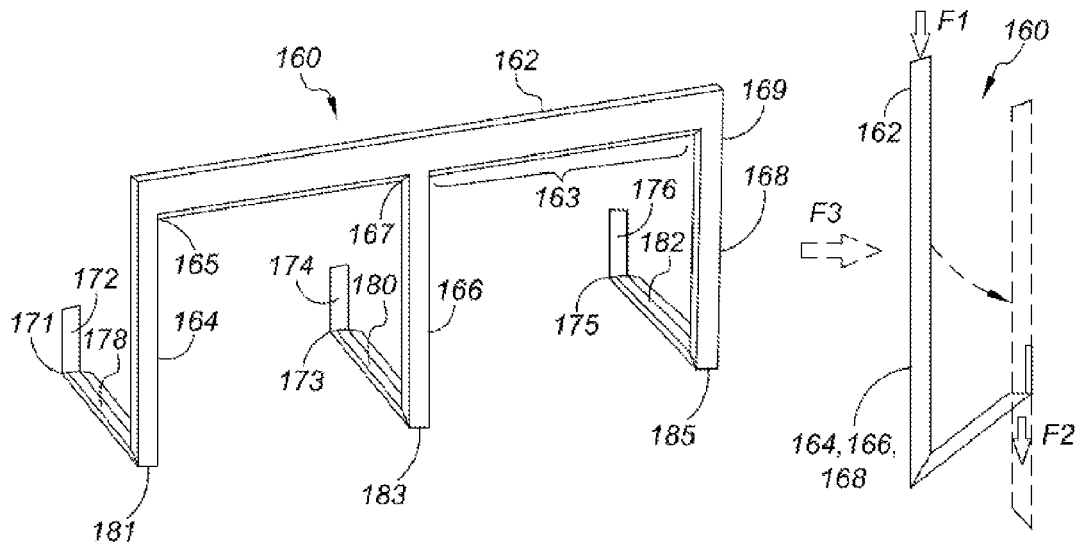
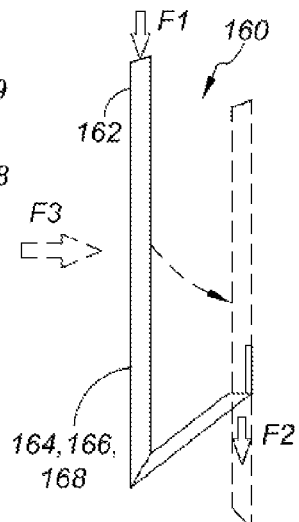
FIG. 4    FIG. 4A

ARMREST SUPPORT BRACKET FOR MOTORIZED VEHICLES

TECHNICAL FIELD

The present invention relates generally to door assemblies for motorized vehicles, and more specifically to mechanisms for limiting the vertical deflection of vehicle door armrest assemblies, while allowing for horizontal deformation under certain predetermined lateral loading conditions.

BACKGROUND OF THE INVENTION

Most motorized vehicles include an armrest that extends from the interior surface of each vehicle door assembly. The armrest is typically part of a decorative trim assembly on the inner panel of the door assembly, and is often integrated with a door latch release lever and a pull-handle or pull-cup feature used to open and close the door assembly. The majority of conventional armrest assemblies are self-contained units that are adapted to be positively attached to the door inner panel or other structural components of the vehicle by fasteners, for example, bolts, push pins, or heat stakes. The armrest is intended, in part, to provide a surface on which a vehicle occupant seated adjacent the door may rest the lower extremities of his or her arm.

A door pull-handle or pull-cup feature is typically employed to pull a vehicle door assembly from an open position to a closed position once the occupant has entered the vehicle, and vice-versa while the occupant alights from the vehicle. The door pull-handle or pull-cup feature can also be used as a support surface for the occupant, which can occur, for example, during ingress/egress to a truck, van, or large sport utility vehicle (SUV) where the passenger compartment is often positioned above the waist line of a typical occupant. Similarly, the armrest assembly, including the pull-handle/pull-cup, is sometimes used to support the entire weight of an occupant—e.g., when used as a standing platform for access to the vehicle roof. Depending upon the degree of reliance by the occupant on the armrest assembly as a support, as well as the occupant's mass and manner of loading the armrest assembly, it is possible that substantial vertical and horizontal loads can be generated on the armrest assembly and pull-handle/pull-cup feature.

Armrest assemblies are often relatively rigid and structurally robust in order to withstand horizontal and vertical loads applied during everyday use of the vehicle. However, the deformability of the armrest and, correspondingly, the armrest's ability to absorb kinetic energy imparted thereto is diminished as the rigidity of the armrest is increased. In contrast, the armrest may be constructed using softer, more compliant materials so that it will yield or deform under the force of impact with a foreign or local object. However, the resiliency and durability of the armrest assembly for normal use may diminish with an overly compliant construction. Ideally, the armrest should deform in a manner to absorb the impact energy imparted thereto, while maintaining a sufficiently resilient and robust configuration for everyday use purposes.

SUMMARY OF THE INVENTION

According to one embodiment of the present invention, a support bracket for an armrest assembly is provided for use with a motorized vehicle. The armrest assembly includes a pull-handle or a pull-cup defining an internal cavity therein. The support bracket includes a support member configured to mate with the armrest assembly. The support bracket is preferably elongated longitudinally along the interior surface of the vehicle in a generally horizontal manner. It is further desirable that a portion of the support member extend adjacent to, or through an internal cavity of, the pull-handle/pull-cup.

The support bracket also includes at least two, but preferably three leg members spaced apart from one another and operatively attached at respective first ends to the support member. Each leg member extends downward from the support member in an oblique manner to attach at a respective second end to the vehicle interior surface. For example, each leg member preferably extends downward from the support member at an angle of less than 45 degrees from a vertical axis extending through the second end. Ideally, each of the leg members attaches to the vehicle interior surface via an attachment portion extending generally vertically from the second end thereof. As an alternative, each of the leg members preferably forms a J-hook shape between the first and second ends.

The leg members are configured to sustain a predetermined minimum vertical loading condition, and controllably deform under a predetermined threshold lateral loading condition. Ideally, the leg members create a load path for transferring vertical loads imparted to the armrest assembly to the vehicle interior surface as a substantially vertical force. It is also preferred that the support member and the various leg members each consists of a substantially flat, elongated metallic bar.

According to an additional embodiment of the present invention, a door assembly is provided that is secured, hinged, or attached to the body of a motorized vehicle to selectively transition from a closed position to an open position. The door assembly includes an inner support panel with a trim panel operatively attached thereto. Additionally, an armrest assembly is elongated longitudinally along the trim panel relative to the vehicle and extends inward therefrom. The armrest assembly includes a pull-handle or a pull-cup feature defining an internal cavity therein.

A support bracket with a generally horizontal support member and three or more leg members is also included. A portion of the support member is configured to extend adjacent to or through the internal cavity. The leg members are spaced apart from one another, and operatively attached at a respective first end to the support member. The leg members extend downward from the support member in an oblique manner to attach at a respective second end to the inner support panel of the door assembly. The leg members are sufficiently spaced apart from one another to receive a layer of foam or plastic therebetween. The leg members are configured to sustain a predetermined minimum vertical loading condition, and controllably deform under a predetermined threshold lateral loading condition. Ideally, the leg members create a load path for transferring vertical loads imparted to the armrest assembly to the interior surface as a substantially vertical force.

According to another additional embodiment of the present invention, a motorized vehicle is provided. A door assembly is attached to the vehicle to selectively transition from a closed position to an open position. The door assembly includes an inner support panel with a trim panel operatively attached thereto. An armrest assembly is attached or mounted to the trim panel and extends inward therefrom. The armrest assembly has a pull-handle with an internal cavity. A support bracket with a generally horizontal support member and three or more leg members is also included. A portion of the support member extends through the internal cavity of the pull-handle. The leg members are spaced apart from one another, and attached at a respective first end to the support member. The leg members extend downward from the support member in an oblique manner to attach at a respective second end to the inner support panel of the door assembly. The leg members are sufficiently spaced apart from one another to receive a layer of foam or plastic therebetween. The leg members are configured to sustain a predetermined minimum vertical loading condition and controllably deform under a predetermined threshold lateral loading condition.

The above features and advantages, and other features and advantages of the present invention, will be readily apparent from the following detailed description of the preferred embodiments and best modes for carrying out the present invention when taken in connection with the accompanying drawings and appended claims.

BRIEF DESCRIPTION OF THE DRAWINGS

FIG. 3 is a perspective view of the armrest assembly support bracket of FIG. 2;

FIG. 3A is a side-view illustration depicting lateral and vertical loading of the armrest assembly support bracket of FIG. 3;

FIG. 3B is a perspective view of the armrest assembly including the support bracket of FIG. 3;

FIG. 4 is a perspective view of an armrest assembly support bracket in accordance with another embodiment of the present invention; and FIG. 4A is a side-view illustration depicting lateral and vertical loading of the armrest assembly support bracket of FIG. 4.

DESCRIPTION OF THE PREFERRED EMBODIMENTS

Figure 1:
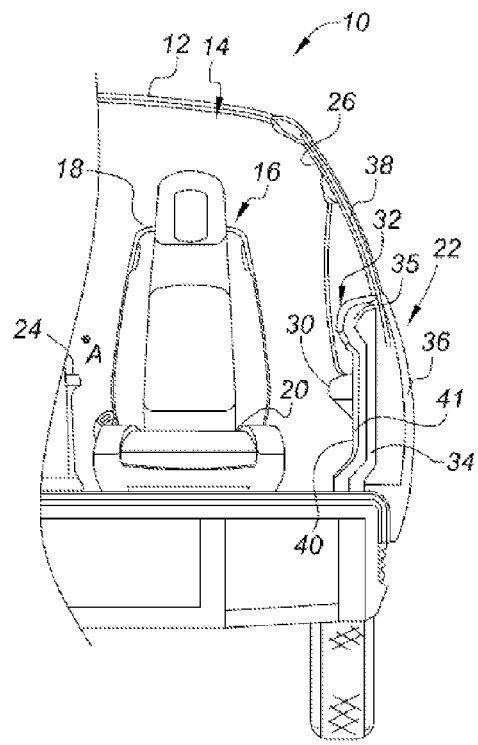
FIG. 1 is a schematic partially cut-away, front-view illustration of a portion of a representative motorized vehicle for practicing the present invention.

Referring to the drawings, wherein like reference numbers refer to like components throughout the several views, FIG. 1 is a partially cut-away front-view illustration of a portion of a representative motorized vehicle, identified generally as 10, with which the present invention may be utilized. It should be readily understood that FIG. 1 is merely an exemplary application by which the present invention may be practiced. As such, the present invention is by no means limited to the vehicle configuration of FIG. 1. For example, although the vehicle 10 is depicted in FIG. 1 as a standard passenger car, the present invention can be incorporated into any vehicle platform, such as, but not limited to, sport utility vehicles, light trucks, heavy duty vehicles, minivans, buses, convertibles, etc. Finally, the drawings presented herein, i.e., FIGS. 1 through 4A, are not to scale and are provided purely for instructional purposes. Thus, the specific and relative dimensions shown in the drawings are not to be considered limiting.

The vehicle 10 has a vehicle body 12 including a vehicle interior, shown in part in FIG. 1 as passenger compartment 14, having one or more vehicle seat assemblies 16 therein. Each seat assembly 16 can be of any suitable or conventional construction, but generally includes a backrest portion 18 and a lower cushion portion 20. The vehicle 10 also includes one or more door assemblies 22 (only one of which is shown in FIG. 1) that are operatively secured to the vehicle body 12 in a manner sufficient to allow each vehicle door assembly 22 to transition from a substantially closed position (as shown in FIG. 1) to a generally open position (not shown), e.g., via vertical hinges or by a mechanical or automated track-and-sled mechanism (not depicted herein). An energy-absorbing armrest assembly 30 is preferably mounted to the vehicle door assembly 22, but may also be mounted directly to a console 24 located within the passenger compartment 14, to an interior panel or substrate, represented in FIG. 1 by vehicle interior surface 26, or any combination thereof. The vehicle body 12 has a longitudinal axis A that extends along the length of the vehicle body 12.

Figure 2:
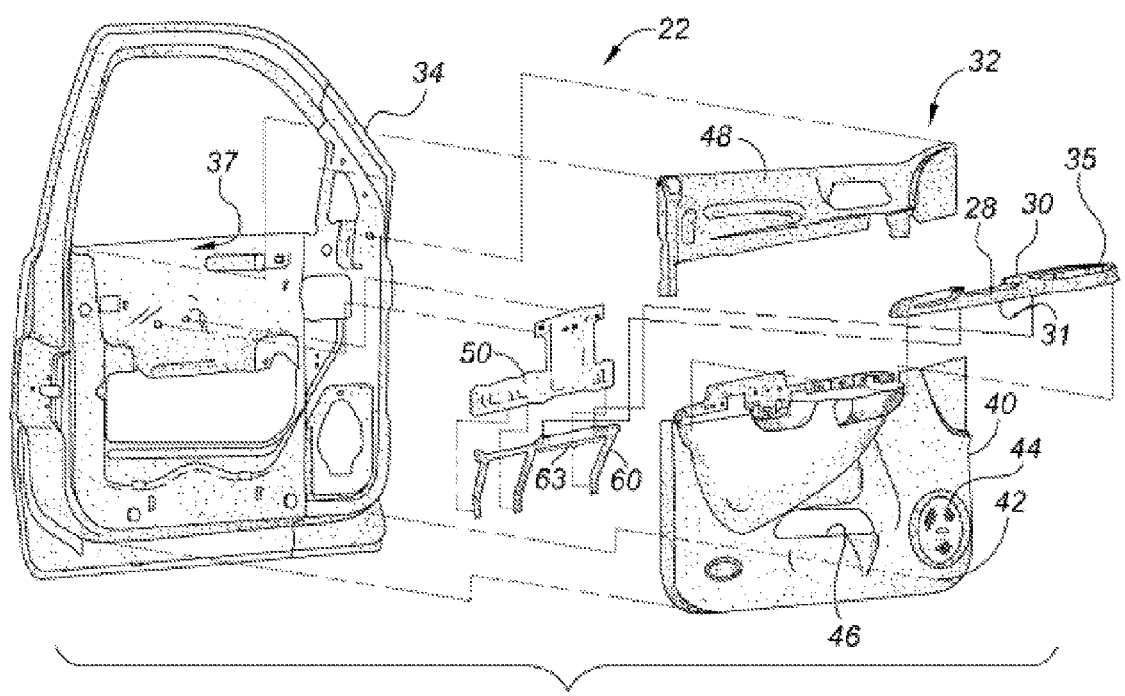
FIG. 2 is an exploded perspective view of the vehicle door assembly of FIG. 1 with an armrest assembly support bracket in accordance with one embodiment of the present invention mounted thereto.

Looking at both FIGS. 1 and 2 now, the vehicle door assembly 22 also includes a door trim assembly 32 mounted to a door inner panel 34 adjacent the passenger compartment 14. The door inner or interior panel 34 is secured e.g., by welding, clinching, or otherwise mechanically fastening portions of the interior panel 34, in opposing relation to a door outer or exterior panel 36. The inner panel 34 is mounted such that it is substantially parallel to and inboard from the door exterior panel 36 to thereby operatively house a power or manually operated window pane 38 therebetween.

The inner and outer door panels 34, 36 are part of the load bearing structure of the door assembly 22. As such, each door panel 34, 36 is preferably manufactured (e.g., punched, pressed, hydroformed, etc.) from a material known to have a suitable strength for the intended use of the vehicle door assembly 22, such as a rigid plastic polymer (e.g., Polymethyl methacrylate or PMMA, or bulk mold compound or BMC), a metallic material (e.g., cold rolled steel, hot dipped galvanized steel, stainless steel, aluminum, and the like), or a combination thereof, and may be finished with an anti-corrosive, highly durable coating (e.g., zinc plating). The door inner panel 34 can be covered by a foam material or padding 35, followed by the door trim assembly 32, which in turn is preferably covered, for example, by a decorative cloth, leather, or vinyl 41.

The armrest assembly 30 is preferably of sufficient length and width to provide support for most of the forearm (e.g., from the elbow to the wrist) of a vehicle occupant (not shown) immediately adjacent the door assembly 22. The armrest assembly 30 is preferably fabricated from a material typical for armrests. For example, the armrest 30 is preferably made from a plastic composite, covered by a foam material or padding, and concealed with a decorative cloth, leather, vinyl, or plastic.

Turning to FIG. 2, an exploded perspective view of the vehicle door assembly 22 of FIG. 1 is illustrated therein. The armrest assembly 30 includes a pull-handle or pull-cup feature 28, which, once assembled to the door trim assembly 32, is oriented laterally inboard relative to the door inner panel 34 and, thus, the vehicle interior surface 26. A cavity 35 is provided at a forward end of the armrest assembly 30. The cavity 35 is dimensioned to receive an electrical switch assembly (or "switch pack") of the type for actuating various vehicle electrical components—e.g., for opening and closing windows, such as power window pane 38 of FIG. 1, for locking and unlocking doors, such as vehicle door assembly 22 of FIG. 1, and for selecting and manipulating either a left- or right-side rearview mirror (not shown) for adjustment.

The trim panel assembly 32 includes various non-load bearing sub-components. For example, a lower trim panel portion 40 is attached to an inner surface 37 of the door interior panel 34 (by fasteners, rivets, or like elements), protruding into the passenger compartment 14 (as seen in FIG. 1). The lower trim panel portion 40 may include certain optional features, such as a lower kick-guard portion 42, an audio speaker 44, and a pocket or cubby hole 46, FIG. 2. An upper trim panel portion 48 attaches to the interior panel 34 vertically proximate to the lower trim panel portion 40.

A trim panel mounting bracket 50 is mounted, in a generally form-fitting manner, on an inner side (e.g., inner surface 37) of the inner panel 34 (e.g., facing the passenger compartment 14 of FIG. 1) by one or more bolts. However, it is also contemplated that the mounting bracket 50 be integrally formed to the inner surface 37 of the door inner panel 34. The mounting bracket 50 is configured to receive and mate with an armrest assembly support bracket 60, which are both intended to be located between the trim panel assembly 32 and the door inner panel 34.

FIG. 3 of the drawings provides a perspective view of the armrest assembly support bracket 60 of FIG. 2. The support bracket 60 includes a support member portion 62 that is configured to mate with the armrest assembly 30 of FIGS. 1 and 2. Specifically, it is desirable that a portion 63 of the support member 62 extend adjacent to or through an open channel or internal cavity of the pull-handle/pull-cup 28 (indicated at 31 in FIG. 2) on the "b-side" of the armrest assembly 30. In a similar respect, the support member 62 is also positioned adjacent to and inside the armrest assembly 30 to support vertical loads imparted thereto (i.e., limit vertical deflection). The support member 62 is preferably elongated longitudinally along the armrest 30 relative to the vehicle 10 in a generally horizontal manner—i.e., generally parallel to axis A of FIG. 1.

The support bracket 60 also includes three leg members—shown in FIG. 3 as first, second and third leg members 64, 66 and 68, respectively. The leg members 64, 66, 68 are spaced apart from one another and operatively attached at respective first ends 65, 67 and 69 to the support member 62. Each leg member 64, 66, 68 extends from the support member 62 in an oblique manner (i.e., neither perpendicular nor parallel) to attach at respective second ends 71, 73 and 75 to the vehicle interior surface, such as interior surface 26 of FIG. 1 or inner surface 37 of inner panel member 34 of FIG. 2. For example, each leg member 64, 66, 68 preferably extends downward from the support member 62 at an angle 70, FIG. 3A, of less than 45 degrees from a vertical axis B extending through the second end (i.e., 71, 73 and 75 of FIG. 3). Ideally, each of the leg members 64, 66, 68 attaches to the vehicle interior surface via an attachment portion 72, 74 and 76, respectively, extending generally vertically from the second end thereof 71, 73 and 75. Notably, the support bracket 60 may include as few as two leg members and more than three leg members, without departing from the intended scope of the present invention.

Looking now to FIG. 3A, the first, second, and third leg members 64, 66, 68 are configured to sustain a predetermined minimum vertical loading condition (depicted in FIG. 3A for illustrative purposes by arrows F1 and F2), and controllably deform under a predetermined threshold lateral loading condition (shown hidden in FIG. 3A for explanatory purposes by arrow F3). For example, the first, second, and third leg members 64, 66, 68 provide sufficient structural rigidity for normal, quasi-static loading purposes—i.e., to maintain at least 250 to 500 Newtons (N) vertical loading and, together with the armrest 30 and pull-handle/pull-cup feature 28, 300N horizontal loading, but will controllably deform or collapse under atypical or dynamic loading scenarios—i.e., at or above a 2000N lateral crush force. In essence, the armrest assembly support bracket 60 of the present design significantly "decouples" (i.e., makes independent or mutually exclusive) the quasi-static vertical loading (e.g., F1 and F2 of FIG. 3A) of the armrest assembly 30 and pull-handle/pull-cup 28, FIG. 1, from the dynamic lateral loading (e.g., F3 of FIG. 3A).

Ideally, the first, second, and third leg members 64, 66, 68 create a predetermined load path for transferring vertical loads, F1, imparted to the armrest assembly 30 and pull-handle/pull-cup 28 to the vehicle interior surface, such as interior surface 26 of FIG. 1 or inner surface 37 of inner panel member 34 of FIG. 2, as a substantially vertical force, F2. More specifically, the leg members 64, 66, 68 of FIG. 3 redirect the path (or spatial vector) of the vertical load F1, thus, redistributing load F1 to the vehicle interior surface as a substantially vertical resultant force F2. It is also preferred that the support member 62 and the various leg members 64, 66, 68 each consists of a substantially flat, elongated bar. In this regard, the material, material gauge, and section shape of the support bracket 60 can be selectively varied in order to balance the required vertical stiffness with the lateral stiffness.

Referring now to FIG. 4 of the drawings, a perspective view of an armrest assembly support bracket 160 is shown in accordance with an alternate embodiment of the present invention. The support bracket 160 includes a support member (or longitudinal portion) 162 that is configured to mate with the armrest assembly 30 of FIGS. 1 and 2. Specifically, it is desirable that a portion 163 of the support member 162 of FIG. 4 extend adjacent to or through the open channel or internal cavity of the pull-handle/pull-cup 28 (indicated at 31 in FIG. 2) on the "b-side" of the armrest assembly 30. The support member 162 is preferably elongated longitudinally along the armrest 30 relative to the vehicle 10 in a generally horizontal manner—i.e., generally parallel to axis A of FIG. 1.

The support bracket 160 of FIG. 4 includes at least two, but preferably three leg members—shown in FIG. 4 as first, second and third leg members 164, 166 and 168, respectively. The leg members 164, 166, 168 are spaced apart from one another and operatively attached at respective first ends 165, 167 and 169 to the support member 162. Each leg member 164, 166, 168 extends downward from the support member 162 in a vertical manner to attach to an oblique leg member portion 178, 180, 182 at common ends 181, 183 and 185, respectively. Each oblique leg member 178, 180, 182 attaches at a respective second end 171, 173 and 175 to the vehicle interior surface, such as interior surface 26 of FIG. 1 or inner surface 37 of inner panel member 34 of FIG. 2. Ideally, each of the oblique leg members 178, 180, 182 attaches to the vehicle interior surface via an attachment portion 172, 174 and 176, respectively, extending generally vertically from the second end thereof 171, 173 and 175. According to the embodiment of FIG. 4, each of the leg member combinations 164, 178, 172; 166, 180, 174; and 168, 182, 176 form or define a "J-hook" shape.

Looking now to FIG. 4A, the first, second, and third leg member combinations 164, 178; 166, 180; and 168, 182 are configured to sustain a predetermined minimum vertical loading condition (depicted in FIG. 4A for illustrative purposes by arrows F1 and F2), and controllably deform under a predetermined threshold lateral loading condition (shown hidden in FIG. 4A for explanatory purposes by arrow F3). For example, the first, second, and third leg member combinations 164, 178; 166, 180; and 168, 182 provide sufficient structural rigidity for normal, quasi-static loading purposes—i.e., to maintain at least 250 to 500 Newtons (N) vertical loading and, together with the armrest assembly 30 and pull-handle/pull-cup 28, 300N horizontal loading, but will controllably deform or collapse under atypical or dynamic loading scenarios—i.e., at or above a 2000N lateral crush force. In essence, the armrest assembly support bracket 160 of the present design significantly "decouples" (i.e., makes independent or mutually exclusive) the quasi-static vertical loading (e.g., F1 and F2 of FIG. 4A) of the armrest assembly 30 and pull-handle/pull-cup 28 from the dynamic lateral loading (e.g., F3 of FIG. 4A).

According to the embodiment of FIG. 4, the first, second, and third leg member combinations 164, 178; 166, 180; and 168, 182 create a predetermined load path for transferring vertical loads, F1, imparted to the armrest assembly 30 and pull-handle/pull-cup 28 to the vehicle interior surface, such as interior surface 26 of FIG. 1 or inner surface 37 of inner panel member 34 of FIG. 2, as a substantially vertical force, F2. More specifically, the leg member combinations 164, 178; 166, 180; and 168, 182 of FIG. 4 redirect the path (or spatial vector) of the vertical load F1, thus, redistributing load F1 to the vehicle interior surface as a substantially vertical resultant force F2. It is also preferred that the support member 162 and the various leg member combinations 164, 178; 166, 180; and 168, 182 each consists of a substantially flat, elongated bar. In this regard, the material, material gauge, and section shape of the support bracket 160 can be selectively varied in order to balance the required vertical stiffness with the lateral stiffness.

While the best modes for carrying out the present invention have been described in detail, those familiar with the art to which this invention relates will recognize various alternative designs and embodiments for practicing the invention within the scope of the appended claims.

The invention claimed is:

1. A support bracket for an armrest assembly in a motorized vehicle having an interior surface, the armrest assembly having at least one of a pull-handle and a pull-cup defining an internal cavity therein, comprising:
    a support member configured to mate with the armrest assembly;
    a first and a second leg member, each operatively attached at a first end to said support member and extending downward therefrom to attach at a second end to the vehicle interior surface;
    wherein at least a portion of each of said first and second leg members is oblique to said support member;
    wherein each of said first and second leg members is operatively attachable to the vehicle interior surface via an attachment portion extending generally vertically from said second end;
    wherein each of said first and second leg members form a J-hook shape between said first and second ends; and
    said second leg member is spaced longitudinally from said first leg member;
    wherein said first and second leg members are operatively configured to sustain a predetermined minimum vertical loading condition and controllably deform under a predetermined threshold lateral loading condition.

2. The support bracket of claim 1, wherein at least a portion of said support member is disposed in the internal cavity of the at least one pull-handle and pull-cup.

3. The support bracket of claim 1, wherein the support bracket is elongated longitudinally along the interior surface relative to the vehicle in a generally horizontal manner.

4. The support bracket of claim 1, further comprising:
    a third leg member spaced from said first and second leg members and operatively attached at a first end to said support member and extending downward therefrom in an oblique manner to attach at a second end to the vehicle interior surface;
    wherein said third leg member is operatively configured to sustain a predetermined minimum vertical loading condition and controllably deform under a predetermined threshold lateral loading condition.

5. The support bracket of claim 1, wherein said first and second leg members extend downward from said support member at an angle of less than 45 degrees from a vertical axis extending through said second ends.

6. The support bracket of claim 1, wherein said first and second leg members are configured to create a load path for transferring vertical loads imparted to the armrest assembly to the vehicle interior surface as a substantially vertical force.

7. The support bracket of claim 1, wherein said support member and said first and second leg members each consists essentially of a substantially flat elongated metallic bar.

8. A door assembly operatively attached to a body of a motorized vehicle to selectively transition from a substantially closed position to a generally open position, the door assembly comprising:
    an inner support panel;
    a trim panel operatively attached to said inner support panel;
    an armrest assembly elongated longitudinally along said trim panel relative to the vehicle and extending inward therefrom, said armrest assembly having a pull-handle defining an internal cavity therein; and
    a support bracket including:
        a generally horizontal support member disposed at least in part in said internal cavity of said pull-handle;
        at least three leg members spaced apart from one another and operatively attached at a respective first end to said support member and extending downward therefrom to attach at a respective second end to said inner support panel;
        wherein at least a portion of each of said at least three leg members is oblique to said support member;
        wherein each of said at least three leg members extends downward from said support member at an angle of less than 45 degrees from a vertical axis extending through said respective second ends;
        wherein each of said at least three leg members is operatively attachable to said inner support panel via an attachment portion extending generally vertically from said respective second ends;
        wherein each of said at least three leg members forms a J-hook shape between said first and second ends; and
        wherein said leg members are operatively configured to sustain a predetermined minimum vertical loading condition and controllably deform under a predetermined threshold lateral loading condition.

9. The door assembly of claim 8, wherein said at least three leg members are sufficiently spaced apart from one another to receive a layer of foam or plastic therebetween.

10. The door assembly of claim 9, wherein said support member and said at least three leg members each consists essentially of a substantially flat elongated metallic bar.

11. The door assembly of claim 9, wherein said at least three leg members are configured to create a load path for transferring vertical loads imparted to said armrest assembly to said inner support panel as a substantially vertical force.

12. A motorized vehicle having vehicle structure, comprising:
    a door assembly operatively attached to the vehicle structure to selectively transition from a closed position to an open position, said door assembly including an inner support panel with a trim panel operatively attached thereto;

an armrest assembly operatively attached to said door assembly trim panel and extending inward therefrom, said armrest assembly having a pull handle defining an internal cavity therein; and a support bracket including:
- a generally horizontal support member configured to be disposed at least in part in said internal cavity of said pull handle;
- first, second, and third leg members spaced apart from one another and operatively attached at a respective first end to said support member and extending downward therefrom to attach at a respective second end to said inner support panel;

wherein at least a portion of each of said first, second and third leg members is oblique to said support member;

wherein each of said leg members is operatively attachable to said inner support panel via an attachment portion extending generally vertically from said respective second ends;

wherein each of said leg members forms a J-hook shape between said respective first and second ends; and wherein said leg members are operatively configured to sustain a predetermined minimum vertical loading condition and controllably deform under a predetermined threshold lateral loading condition.

13. The vehicle of claim 12, wherein said first, second, and third leg members are sufficiently spaced apart from one another to receive a layer of foam or plastic therebetween.

* * * * *